Figure 1:
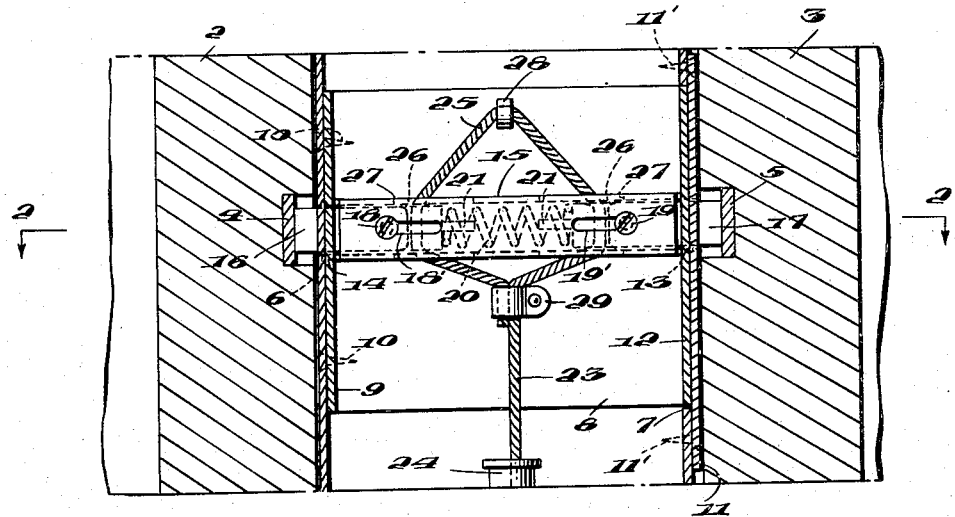

Feb. 14, 1950

W. R. YOST ET AL 2,497,485

MULTIPLE SAFETY LOCK

Filed Nov. 9, 1948

Inventors
WALTER R. YOST,
HERMAN B. WAMPLER,

By Babcock & Babcock

Attorney

Patented Feb. 14, 1950

2,497,485

UNITED STATES PATENT OFFICE 2,497,485

MULTIPLE SAFETY LOCK

Walter R. Yost and Herman B. Wampler, Washington, D. C.

Application November 9, 1948, Serial No. 59,114

5 Claims. (Cl. 292—38)

This invention relates to multiple safety locks for the doors of automobiles and the like.

Such locks are intended primarily for use in automobiles of the type having four doors disposed in pairs on opposite sides thereof, and may be associated with the respective pairs of doors for use as auxiliary locking means additional to the conventional door locks to afford a centrally controllable locking system for preventing unauthorized or accidental opening of the doors from either the exterior or the interior of the automobile in substantially the manner disclosed in the Castle Patent 2,254,419. As thus employed, said locks are of especial advantage in preventing the accidental opening of the doors by children or other passengers with resultant risk of serious injury, or in preventing the escape of prisoners from police vehicles, as well as in preventing unauthorized entry of persons into the automobile. It is to be understood however that the invention is not limited to this particular use, but may be used for other purposes.

A lock constructed in accordance with the invention comprises a pair of slidably mounted bolts adapted to cooperate with the two relatively adjacent doors on either side of an automobile, in combination with a common flexible actuating means for said bolts which may be led through a suitable conduit or other guide means to any suitable location, preferably adjacent the driver's seat, to permit remote control of the lock from said location.

It is a primary object of the invention to provide a simplified construction of lock in which the flexible actuating means is directly slidably associated with the lock and the bolts thereof, to retract said bolts without the intervention of additional force transmitting mechanism.

A further important object is to provide such a lock in which the flexible actuating means is operable to retract either of the oppositely projected bolts by itself, in the event one of said bolts should become jammed, as in the event of a collision, thereby effectively safeguarding against the accidental entrapment of passengers within the automobile.

A further object is to provide such a lock in which one of the bolts may be entirely omitted from the lock structure without adversely effecting the actuation of the remaining bolt, thus permitting easy adaptation of the lock for use with only one door in the manner of a single lock.

Further specific objects are: to provide in such a lock a simplified mounting and guide means for the movable parts of the lock, thereby facilitating the economical production of the lock; and, to provide a simplified assembly of the lock within the automobile post so that the lock may be readily applied to existing automobiles without disfiguring or extensively altering same.

In this application we show and describe only the preferred embodiment of our invention, simply by way of illustration of the practice thereof, as by law required. However we recognize that our invention is capable of other and different embodiments and that the different details thereof may be modified in various respects, all without departing from our said invention. Accordingly, the drawings and description herein are to be considered as merely illustrative of the invention, and not as exclusive of other possible embodiments thereof.

Figure 2:
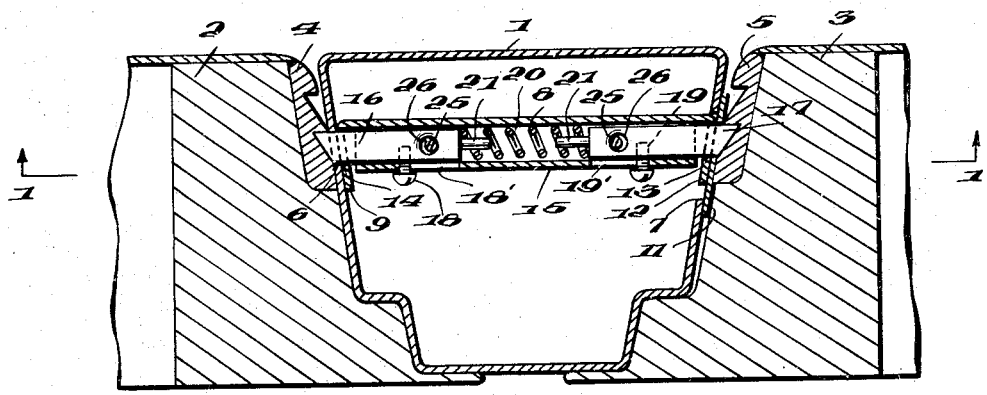

In the accompanying drawings:

Figure 1 represents a vertical cross section through the center post and adjoining portions of the doors of an automobile embodying our invention, said section being taken on the line 1—1 of Figure 2 and looking in the direction of the arrows toward the interior of the automobile; and, Figure 2, a horizontal section on the line 2—2 of Figure 1, looking in the direction of the arrows.

Referring now in detail to the accompanying drawings, the reference character 1 therein designates a usual hollow metal post or pillar of an automobile of the type which has a pair of doors 2 and 3 respectively engaging thereon. These doors have relatively adjacent free edges which are adapted to swing or close against the post 1, in usual manner. Said doors and the post 1 may be of any usual construction, and the doors may be equipped with conventional door handles and locks, though such details constitute no part of the instant invention and therefore are not illustrated.

The lock of the invention is mounted interiorly of the post 1 for cooperation with both doors 2 and 3, each of which may be adapted for such cooperation by the provision of a usual keeper, said keepers being designated 4 and 5 respectively. These keepers 4 and 5 are in relatively horizontally opposed relationship on opposite sides of the post 1 and may be countersunk into the edges of their respective doors, as shown, to lie substantially flush therewith in usual manner.

In order to adapt the post 1 for application of the lock, it is necessary only that said post be provided with a relatively small bolt opening 6 through one side thereof opposite one of the keepers 4, and a comparatively larger lock receiving opening 7 through the other side thereof opposite the keeper 5, the opening 7 being of sufficient size relative to the assembled lock to permit edgewise insertion of the lock therethrough into operative position in the post 1.

The lock itself in the preferred embodiment comprises a frame or base which is in the form of a flat mounting plate 8 adapted to carry the movable elements of the lock. This plate 8 is proportioned to extend completely across the interior of the post 1 between the keepers 4 and 5 and is provided with suitable means for securing it in operative position therein. Such means in the preferred embodiment comprises an integral securing flange 9 at one end of the plate 8 which abuts against and is secured to its respective side of the post 1, as by sheet metal screws 10, and an escutcheon plate 11 carried at the other end of plate 8. This escutcheon plate is of larger size than the opening 7 to cover said opening and be secured flush against the external face of post 1 surrounding said opening, as by sheet metal screws 11'.

In order to provide a convenient and rigid connection between the escutcheon 11 and plate 8, the plate 8 may be provided with a relatively angularly disposed flange 12 which is fixed flush against the rear face of the escutcheon 11 and in effect constitutes a portion thereof.

Relatively horizontally aligned bolt openings 13 and 14 are formed through the escutcheon 11, including its associated flange 12, and through the flange 9 respectively, the opening 14 in flange 9 being operatively disposed in registry with the opening 6 through the post side wall.

A guide channel 15 is secured to the plate 8 in any suitable manner and extends across said plate between the bolt openings 13 and 14, and as thus arranged constitutes the preferred means for slidably associating the bolts 16 and 17 with the plate 8, said bolts being slidably disposed in the channel 15 and spaced apart therein for movement through the respective bolt openings 14 and 13 into and out of operative locking engagement with the respective keepers 4 and 5.

Means for limiting the movement of the bolts to their respective operative ranges may comprise screws 18 and 19 threaded into the respective bolts 16 and 17 and projecting therefrom for movement in slots 18' and 19' respectively formed in the channel member 15, the engagement between the screws and the opposite ends of their respective slots obviously determining the limits of permissible movement of the bolts in either direction.

In order to normally resiliently project the bolts 16 and 17 outwardly through their respective openings into operative engagement with the keepers 4 and 5, a usual coil spring 20 is disposed under compression between said bolts interiorly of the channel 15. While the channel or channel member 15 may be relied upon to properly position the spring 20 and maintain same in axial alignment with the bolts, it is desirable to further position and align the spring by providing the respective bolts with relatively aligned positioning pins 21—21 projecting axially into opposite ends of the spring 20.

A flexible actuating cable 23 is led to the lock through the post 1 from any desired control point, as by a usual housing or conduit 24 through which said cable is slidably disposed. The end of this conduit adjacent the lock terminates at a location in a plane extending medially between the bolts 16 and 17 and transversely to the operative movement thereof, so that when connected to the lock the cable 23 will be operative to exert tension transversely to the operative movement of the bolts 16 and 17.

One end of this cable projects from the conduit 24, as shown in Figure 1, and has a preferably integral section in the form of a loop 25 which has portions slidably connected to each of the bolts 16 and 17, preferably by being threaded through transverse cable openings or passages 26 in each of these bolts. It will be noted that the channel member 15 is formed with slots 27 extending lengthwise of its upper and lower horizontal walls to permit passage of said cable and avoid interference with the movement of said cable together with the respective bolts.

At a location disposed in a plane extending medially between and transversely to the said bolts, a portion of the cable loop 25 is slidably connected to a stationary portion of the lock, as by slidably threading it through an apertured lug or cable guide 28 secured to the mounting plate 8.

In the preferred embodiment of the invention, the cable 23 is assembled relative to the lock by threading the free end of said cable upwardly through the bolt 17, passing it through the guide 28, then passing it downwardly through the bolt 16 and securing said free end to the adjacent main portion of the cable, as by a usual clamp 29 or in any other desired manner, thus forming the closed loop 25.

As thus arranged, it will be seen that tension exerted on the cable 23 will tend to draw together the portions of the loop 25 on opposite sides of the cable guide 28, thus retracting the two bolts 16 and 17 against the resilient thrust exerted by their common compression spring 20.

In the event an automobile equipped with such a lock or locks is involved in a collision or any other occurrence which might cause one of the bolts 16 or 17 to become jammed in locking engagement with its respective keeper 4 or 5, the cable 23 will nevertheless be operable to retract the other of said bolts inasmuch as it will be free to slide through the jammed bolt and the cable guide 28 during such retraction. Obviously this is of extreme importance as insuring against the entrapment of passengers in an automobile equipped with the locks of the invention.

While the foregoing description and accompanying drawings show and describe the lock as applied to one side of an automobile to cooperate with two doors of that side, it is obviously contemplated that normally such locks will be applied to both sides of the automobile to control all of the doors thereof. If desired the actuating cables 23 of both locks may be led through their respective conduits to a common control point or element which may be located on or adjacent the dash or instrument panel of the automobile, as disclosed in the Vandeveld Patent 2,174,231.

It is believed to be readily apparent that a lock embodying our invention may be readily adapted for use as a single lock for cooperation with only one door or closure member, merely by omitting or removing either of the bolts 16 or 17 and providing a suitable plug or means to take the thrust of the spring 20 in place of said removed bolt and maintain same under compression.

We claim:

1. A multiple lock comprising, a flat mounting plate having relatively angularly disposed securing flanges at opposite ends thereof, an escutcheon being secured to one of said flanges, said flanges and said escutcheon respectively having relatively aligned bolt openings therethrough, a guide channel secured to said plate and extending between said openings, a pair of relatively spaced oppositely disposed bolts slidably disposed in said channel for movement through said respective openings, a helical spring disposed under compression in said channel between said bolts and normally projecting said bolts into operative locking position through said respective openings, said bolts being provided with relatively aligned spring positioning pins projecting into opposite axial ends of said spring, said bolts having cable openings disposed therethrough transversely to said channel and said channel having cable slots therethrough in registry with the respective opposite ends of said cable openings in all operative positions of said bolts, in combination with actuating means operable to retract said bolts through their respective openings comprising, a cable guide fixed to said mounting plate medially between and to one side of said bolts, a flexible cable extending transversely to the movement of said bolts from the side thereof opposite said cable guide, said cable being formed in a closed loop having a portion slidably disposed through said cable guide and portions on opposite sides of said cable guide slidably disposed through the respective cable openings in said bolts, whereby tension exerted on said cable transversely to the movement of said bolts will retract same.

2. A multiple lock comprising, a flat mounting plate having relatively angularly disposed securing flanges at opposite ends thereof, said flanges respectively having relatively aligned bolt openings therethrough, a guide channel secured to said plate and extending between said openings, a pair of relatively spaced bolts slidably disposed in said channel for operative movement through said respective openings, a spring disposed under compression in said channel between said respective bolts and normally urging said bolts into operative locking position through their respective openings, said bolts having cable openings disposed therethrough transversely to said channel and said channel having slots therethrough in registry with said openings, in combination with actuating means operable to retract said bolts to inoperative position, comprising a flexible cable and means guiding same for sliding movement transversely to the operative movement of said bolts, said cable terminating in a closed loop having portions slidably disposed through said cable openings in the respective bolts, said loop being slidably connected to said mounting plate at a location in a transverse plane extending medially between said bolts, whereby tension exerted on said cable will retract said bolts.

3. A multiple lock comprising, a flat mounting plate, a guide channel secured to said plate and extending thereacross, a pair of relatively spaced bolts disposed in said channel for operative sliding movement, a spring disposed in said channel under compression between said bolts and normally urging same into operative locking position through their respective ends of said channel, said bolts having cable openings therethrough transversely to said channel, and said channel having slots therethrough in registry with said openings, in combination with a flexible cable and means guiding same for sliding movement transversely to the operative movement of said bolts, said cable being formed in a closed loop having opposite side portions slidably disposed through cable openings in the respective bolts, the medial portion of said loop between said bolts being slidably connected to said mounting plate, whereby tension exerted on said cable will retract said bolts.

4. A multiple lock comprising, a mounting plate, a guide channel secured to and extending across said plate, a pair of bolts slidably disposed in said channel, a compression spring disposed in said channel between said bolts and normally urging same into operative locking position through their respective ends of said channel, in combination with a flexible cable formed into a closed loop, opposite side portions of said loop being slidably connected to said respective bolts, the medial portion of said loop between said bolts being slidably connected to said mounting plate, whereby tension exerted on said loop transversely to said channel will retract said bolts.

5. A multiple lock comprising a mounting plate adapted to be secured in position in a hollow door post of an automobile between oppositely horizontally disposed openings in said post, a pair of relatively aligned bolts slidably carried by said plate for movement through said respective openings, resilient means urging said bolts through their respective openings into operative engagement with the adjacent vehicle doors, and a cable guide secured to said mounting plate in a vertical plane extending medially between said bolts, in combination with a flexible actuating cable slidably disposed through said cable guide and having portions on opposite sides of said guide slidably connected to the respective bolts for movement transversely to the linear movement thereof, said portions being connected to form a closed loop, whereby a pulling force exerted on said loop at a location opposite said cable guide will draw together the said portions of said cable and retract said bolts.

WALTER R. YOST.
HERMAN B. WAMPLER.

REFERENCES CITED

The following references are of record in the file of this patent:

UNITED STATES PATENTS

| Number | Name | Date |
| --- | --- | --- |
| 2,174,231 | Vandeveld | Sept. 26, 1939 |
| 2,389,315 | Kerr | Nov. 20, 1945 |

FOREIGN PATENTS

| Number | Country | Date |
| --- | --- | --- |
| 743 | Great Britain | Nov. 11, 1893 |